(12) United States Patent
Herle

(10) Patent No.: US 12,345,640 B2
(45) Date of Patent: Jul. 1, 2025

(54) SYSTEMS AND METHODS FOR THE IN-LINE MEASUREMENT OF ALKALI METAL-CONTAINING STRUCTURES AND ALKALI ION-CONTAINING STRUCTURES

(71) Applicant: Elevated Materials US LLC, Santa Clara, CA (US)

(72) Inventor: Subramanya P. Herle, Mountain View, CA (US)

(73) Assignee: Elevated Materials US LLC, Santa Clara, CA (US)

(*) Notice: Subject to any disclaimer, the term of this patent is extended or adjusted under 35 U.S.C. 154(b) by 152 days.

(21) Appl. No.: 17/982,911

(22) Filed: Nov. 8, 2022

(65) Prior Publication Data

US 2023/0160821 A1 May 25, 2023

Related U.S. Application Data

(60) Provisional application No. 63/281,447, filed on Nov. 19, 2021.

(51) Int. Cl.
| | |
|---|---|
| *G01N 21/63* | (2006.01) |
| *G01N 21/88* | (2006.01) |
| *G01N 21/84* | (2006.01) |

(52) U.S. Cl.
CPC ............ *G01N 21/63* (2013.01); *G01N 21/88* (2013.01); *G01N 2021/8416* (2013.01); *G01N 2201/125* (2013.01)

(58) Field of Classification Search
CPC ............ G01N 21/63; G01N 21/88; G01N 2021/8416; G01N 2201/125
See application file for complete search history.

(56) References Cited

U.S. PATENT DOCUMENTS

2015/0349371 A1  12/2015  Neudecker et al.
2017/0229731 A1*  8/2017  Visco ............... H01M 10/0562
(Continued)

FOREIGN PATENT DOCUMENTS

| JP | 3218001 B2 | 10/2001 | |
|---|---|---|---|
| KR | 20130064853 A | 6/2013 | |
| KR | 20200127791 A * | 11/2020 | ............ G16C 20/10 |

OTHER PUBLICATIONS

Patrick Schairer et al., "An Experimental Introduction to Basic Principles of the Interaction of Electromagnetic Radiation with Matter," World Journal of Chemical Education, vol. 6, No. 1 (2018): 29-35.

(Continued)

*Primary Examiner* — Jamil Ahmed
(74) *Attorney, Agent, or Firm* — Lee & Hayes, P.C.

(57) ABSTRACT

Embodiments of the present disclosure generally relate to systems and methods for in-line measurement of alkali metal-containing structures or alkali ion-containing structures of, e.g., electrodes. In an embodiment, a system for processing an electrode is provided. The system includes a first processing chamber for forming an electrode comprising an alkali metal-containing structure. The system further includes a metrology station coupled to and in-line with the first processing chamber, the metrology station comprising: a source of radiation for delivering radiation to the alkali metal-containing structure, and an optical detector for receiving an emission of radiation emitted from the alkali metal-containing structure, and a processor configured to determine a characteristic of the alkali metal-containing structure of the electrode based on the emission of radiation.

18 Claims, 5 Drawing Sheets

(56) References Cited

U.S. PATENT DOCUMENTS

2019/0036118 A1   1/2019  Ofer et al.
2022/0190306 A1*  6/2022  Ishikawa .............. H01M 4/661

OTHER PUBLICATIONS

International Search Report and Written Opinion dated Mar. 23, 2023 for Application No. PCT/US2022/049272.

* cited by examiner

SYSTEMS AND METHODS FOR THE IN-LINE MEASUREMENT OF ALKALI METAL-CONTAINING STRUCTURES AND ALKALI ION-CONTAINING STRUCTURES

CROSS-REFERENCES TO RELATED APPLICATIONS

This application claims benefit of and priority to U.S. Provisional Patent Application Ser. No. 63/281,447, filed on Nov. 19, 2021, which is incorporated herein by reference in its entirety.

BACKGROUND

Field

Embodiments of the present disclosure generally relate to systems and methods for in-line measurement of alkali metal-containing structures or alkali ion-containing structures of, e.g., electrodes.

Description of the Related Art

Characteristics of lithium (Li) coatings on pre-lithiated anodes, such as thickness, are difficult to measure due to, e.g., surface roughness of the anode surface. Accurate measurements of Li depth profiles are also challenging to obtain due to Li diffusion into the anode over time and at elevated temperatures. Currently, measurements of lithium or other alkali metals are performed at remote stations, which is time consuming Moreover, although laser-based sensors can be utilized to measure various characteristics of Li coatings, or other alkali metal coatings, on flat surfaces, such laser-based approaches fail to accurately measure characteristics of the alkali metal coatings on surfaces having increased surface roughness.

There is a need for improved systems and methods for measurement of alkali metal-containing structures or alkali ion-containing structures of electrodes.

SUMMARY

Embodiments of the present disclosure generally relate to systems and methods for in-line measurement of alkali metal-containing structures or alkali ion-containing structures of, e.g., electrodes.

In an embodiment, a system for processing an electrode is provided. The system includes a first processing chamber for forming an electrode comprising an alkali metal-containing structure. The system further includes a metrology station coupled to and in-line with the first processing chamber, the metrology station comprising: a source of radiation for delivering radiation to the alkali metal-containing structure, and an optical detector for receiving an emission of radiation emitted from the alkali metal-containing structure, and a processor configured to determine a characteristic of the alkali metal-containing structure of the electrode based on the emission of radiation. In some embodiments, the alkali metal-containing structure comprises Li, Na, K, Rb, Cs, an ion thereof, or combinations thereof. In at least one embodiment, the electrode is a pre-lithiated anode or a pre-sodiated anode. In some embodiments, the processor is further configured to: determine a first value of the characteristic; and compare the first value of the characteristic to a threshold value or range. In at least one embodiment, when the first value of the characteristic is equal to or above the threshold value or range, the processor is further configured to cause the electrode to transfer from the metrology station to a second processing chamber, the second processing chamber being the same as, or different from, the first processing chamber. In some embodiments, when the first value of the characteristic is equal to or above the threshold value or range, the processor is further configured to: determine a second value of the characteristic; and compare the second value of the characteristic to the threshold value or range. In at least one embodiment, when the first value of the characteristic is less than the threshold value or range, the processor is further configured to cause the electrode to be packaged or integrated into a device. In some embodiments, the radiation delivered is infrared radiation, ultraviolet radiation, visible radiation, or combinations thereof. In at least one embodiment, the optical detector and the processor are at least a portion of a spectrometer. In some embodiments the optical detector detects an emission spectral intensity of laser-ablated alkali metal; and the processor analyzes the emission spectral intensity of laser-ablated alkali metal. In at least one embodiment, the characteristic is a presence, a thickness, a depth profile, a concentration, or combinations thereof.

In another embodiment, a method for processing an electrode comprising an alkali metal-containing structure is provided. The method includes forming an electrode in a first processing chamber, the electrode comprising an alkali metal-containing structure, the alkali metal-containing structure comprising Li, Na, K, Rb, Cs, an ion thereof, or combinations thereof; and conveying the electrode to a metrology station in-line with the processing chamber. The method further includes determining a characteristic of the alkali metal-containing structure of the electrode, the electrode disposed in the metrology station, wherein determining a characteristic includes: delivering radiation to the alkali metal-containing structure to produce an emission of radiation from the alkali metal-containing structure, detecting the emission of radiation, and analyzing the emission of radiation, the emission of radiation corresponding to a characteristic of the alkali-metal containing structure. In some embodiments, analyzing the radiation emitted comprises: determining a first value of the characteristic; comparing the first value of the characteristic to a threshold value or range; and changing a processing path of the electrode based on the first value. In at least one embodiment, the electrode is a pre-lithiated anode or a pre-sodiated electrode; and the characteristic is a presence, a thickness, a depth profile, a concentration, or combinations thereof. In some embodiments, the method further comprises conveying the electrode to a second processing chamber for further processing when a first value of the characteristic is equal to or above a threshold value or range, the second processing chamber being the same as, or different from, the first processing chamber. In at least one embodiment, the method further comprises conveying the electrode from the second processing chamber to the metrology station; determining a second value of the characteristic; and comparing the second value of the characteristic to a threshold value or range. In some embodiments, the radiation delivered to the alkali metal-containing structure is infrared radiation, ultraviolet radiation, visible radiation, or combinations thereof; the detecting and analyzing is performed by a spectrometer; or combinations thereof.

In another embodiment, a non-transitory computer-readable medium storing instructions that, when executed on a processor, perform operations for processing a pre-lithiated anode, is provided. The operations include forming a pre-lithiated anode in a processing chamber, the pre-lithiated anode comprising a lithium-containing structure on an anode; conveying the pre-lithiated anode to a metrology station in-line with the processing chamber; and determining a characteristic of the lithium-containing structure of the pre-lithiated anode, the pre-lithiated anode disposed in the metrology station, wherein determining a characteristic comprises: delivering radiation to the lithium-containing structure to produce an emission of radiation from the lithium-containing structure; detecting the emission of radiation; and determining a first value of the characteristic, the characteristic corresponding to the emission of radiation. In some embodiments, wherein the operations further comprise comparing the first value of the characteristic to a threshold value or range; and changing a processing path of the pre-lithiated anode based on the first value. In at least one embodiment, the characteristic is a presence, a thickness, a depth profile, a concentration, or combinations thereof; and the radiation delivered to the lithium-containing structure is infrared radiation, ultraviolet radiation, or visible radiation.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to systems and methods for in-line measurement of alkali metal-containing structures or alkali ion-containing structures of, e.g., electrodes. The systems and methods can be utilized in-line during manufacturing of pre-lithiated anodes in, e.g., roll-to-roll anode manufacturing. Briefly, and in some embodiments, the metrology systems and methods utilize ablation of a minimal portion a lithium-containing structure of a pre-lithiated anode. The ablation causes emission of radiation that can be analyzed to determine a thickness or a depth profile, among other characteristics, of the pre-lithiated anode.

Currently, there is no available in-line tool, system, or method for determining a characteristic of an alkali metal-containing structure or alkali ion-containing structure disposed on an anode. Moreover, while laser-based sensors are utilized to measure various characteristics of Li coatings on flat surfaces such as copper and polyethylene terephthalate (PET), such laser-based approaches fail to accurately measure such characteristics when the alkali metal coatings are on surfaces having increased surface roughness. Embodiments described herein can overcome these and other deficiencies.

For purposes of the present disclosure, the terms "structure", "coating", and "layer" are used interchangeably such that reference to one includes reference to the others. For example, reference to "structure" includes structure, coating, and layer, unless the context indicates otherwise. For purposes of the present disclosure, the terms "pre-lithiated" and "lithiated" are used interchangeably unless the context indicates otherwise, such that reference to "pre-lithiated" includes pre-lithiated and lithiated.

Embodiments of the present disclosure are described with respect to lithium-containing structures. However, it is contemplated that the embodiments described herein can apply to structures comprising lithium (Li), sodium (Na), potassium (K), rubidium (Rb), cesium (Cs), ions thereof, or combinations thereof. For example, one or more characteristics of one or more sodium-containing structures can be determined utilizing one or more embodiments of the present disclosure. Such sodium-containing structures can be a portion of a pre-sodiated anode (or sodiated anode) used in, e.g., sodium ion batteries.

Embodiments of the present disclosure are also described with respect to anodes. However, it is contemplated that the embodiments described herein can apply to electrodes generally, e.g., both anodes and cathodes.

Figure 1:
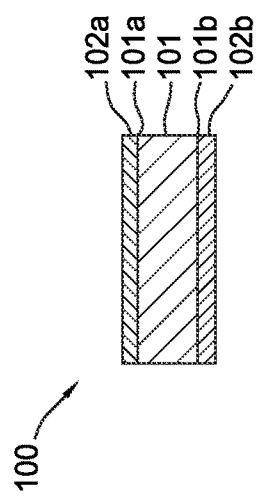
FIG. 1 is a schematic diagram illustrating a cross-sectional view of an example pre-lithiated anode for which one or more characteristics may be determined by embodiments of the present disclosure.

FIG. 1 shows an example of a pre-lithiated anode 100 (or lithiated anode) for which one or more characteristics can be determined. The pre-lithiated anode 100 (or lithiated anode) includes an anode 101. The anode 101 can include a conductive material, typically a metal, such as copper (Cu) or nickel (Ni). The pre-lithiated anode 100 can be configured as a flexible layer stack formed by, e.g., physical vapor deposition, chemical vapor deposition (CVD), transfer processes, spray coating, evaporation, slot die coating processes, and having layers as shown in FIG. 1. Such flexible layer stacks can be made via Applied Materials' Smart-Web®. The pre-lithiated anode 100 or flexible layer stack can be formed by Applied Materials' TopMet™.

After a pre-lithiation deposition operation performed on an anode, the pre-lithiated anode 100 includes a lithium-containing structure, coating, or layer disposed on one or more surfaces/sides, such as two or more surfaces/sides of the anode 101. As shown in FIG. 1, a first lithium-containing structure 102a is disposed on a first surface 101a of the anode 101 and a second lithium-containing structure 102b is disposed on a second surface 101b of the anode 101. Characteristics of the first lithium-containing structure 102a and the second lithium-containing structure 102b (collectively 102) can be determined as described herein via utilizing the emission spectra of laser-ablated Li.

Figure 2:
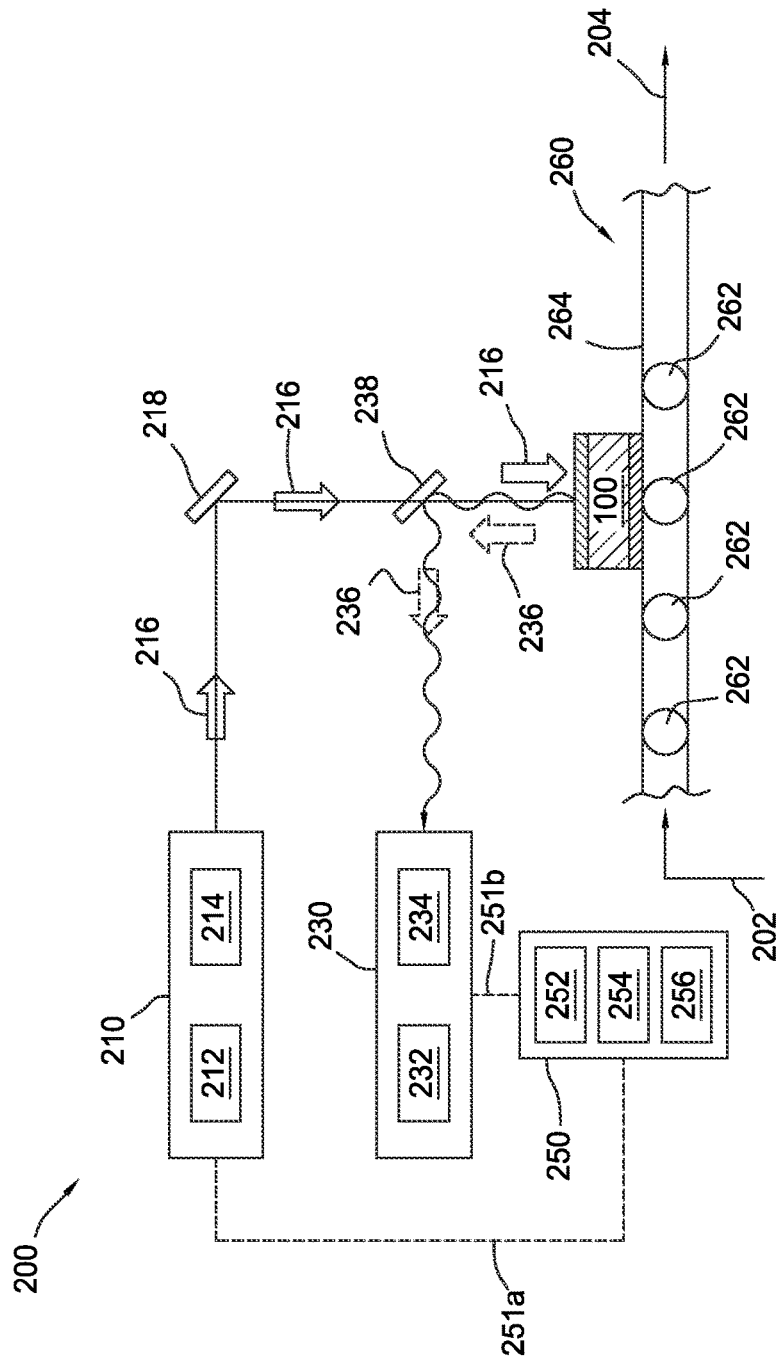
FIG. 2 is a schematic of a system configured to determine one or more characteristics of a lithium-containing structure of a pre-lithiated anode according to at least one embodiment of the present disclosure.

FIG. 2 is a system 200 configured to determine one or more characteristics of a lithium-containing structure disposed on a pre-lithiated anode according to at least one embodiment of the present disclosure. System 200 may also be referred to herein as a metrology station. System 200 can be used with a pre-lithiated anode such as that shown in FIG. 1. System 200 can also be used with a pre-lithiated anode that is configured as a flexible layer stack. Moreover, systems and methods described herein can be utilized in-line during manufacturing of pre-lithiated anodes in, e.g., a roll-to-roll anode manufacturing.

The system 200 includes an electromagnetic (EM) radiation unit 210, an optical detection unit 230, and a controller 250. The EM radiation unit 210 is configured to direct an EM radiation beam, or light beam 216, to the one or more lithium-containing structures 102 of pre-lithiated anode 100. The light beam 216 is utilized to ablate a portion of the one or more lithium-containing structures 102. Wavelengths of light for the light beam 216 directed to the lithium-containing structures 102 can include infrared (IR) light, visible light, ultraviolet (UV) light, or combinations thereof.

The EM radiation unit 210 includes an EM radiation source 212 such as a laser. When a laser is utilized, the laser emits a laser beam as the light beam 216. The light beam 216 can be used specific to Li metal ablation. The EM radiation unit 210 can also include one or more elements 214. The one or more elements 214 can include polarizing elements to generate the desired polarization state of the beam exiting the EM radiation unit 210, optical filters to control spectral output and/or the light level of the EM radiation unit 210, and/or other elements to aid in directing or controlling the light beam 216 exiting the EM radiation unit 210. Such elements may be fixed and/or rotatable. In such cases, the light beam 216 from the EM radiation source 212 can be directed through the one or more elements 214 and focused on the one or more lithium-containing structures 102.

The pre-lithiated anode 100, or a plurality thereof, is disposed on a positioning system 260. The positioning system 260 can be a conveyor, transport belt, or a motorized stage for supporting and transporting a pre-lithiated anode 100, or a plurality thereof, through the metrology station (e.g., the system 200). The positioning system 260 includes support rollers 262 that support and/or drive the transport belt 264. The support rollers 262 can be driven by a mechanical drive, such as a motor/chain drive, and are configured to transport the transport belt 264 at a linear speed of about 0.1 meters per min (m/min) to about 10 m/min, such as from about 0.5 m/min to about 8 m/min, or from about 1 m/min to about 5 m/min during operation. In some embodiments, the linear speed is about 30 m/min to about 50 m/min, such as from about 35 m/min to about 45 m/min. Higher or lower speeds are contemplated. The speed of support rollers 262 can be matched with, or approximately matched with, the speed at which the pre-lithiated anode 100 is formed and/or the speed at which ablation is performed. The mechanical drive can be an electric motor, such as an alternating current (AC) or direct current (DC) servo motor.

The optical detection unit 230 is configured to collect the emitted light 236 (or emitted radiation) from the one or more lithium-containing structures 102 as a result of ablation. The optical detection unit 230 can also be configured to produce or generate output in response to the emitted light 236. As described above, laser ablation of the one or more lithium-containing structures 102 causes an emission of light (e.g., emitted light 236) from the one or more lithium-containing structures 102. Li emits light specifically at about 670.8 nm and such an emission can be used to estimate one or more characteristics of the one or more lithium-containing structures 102.

Generally, the optical detection unit 230 includes a detector 232 (or sensor) that detects one or more of the emissions emitted from the one or more lithium-containing structures 102. The optical detection unit 230 can also include one or more elements 234. The one or more elements 234 can include a diffraction grading that is utilized to separate the incoming light into element-specific wavelengths, e.g., a wavelength specific to lithium. The one or more elements 234 can optionally include optical elements, slits, beam paths, polarizing components, compensators, field stops, aperture stops, etcetera, in any suitable arrangement. An attenuator can also be utilized if, e.g., the optical detection unit is affected by the radiation from the laser or the emission.

As shown in FIG. 2, a mirror 218 can be utilized to direct the light beam 216 toward the one or more lithium-containing structures 102. The mirror 218 may also be used to filter out unwanted wavelengths of light, collimate the light amplification, and/or provide any other optical enhancement. Mirror 238 can be a two-way mirror designed to pass the light beam 216 to the one or more lithium-containing structures 102 while reflecting/directing a subsequent emitted light 236 to the optical detection unit 230. It is contemplated, however, that the system 200 is free of mirrors. In addition, one or more filters can be utilized with the optical detection unit 230 and/or the EM radiation unit 210 to suppress noise.

The controller 250, e.g., a computer unit, is generally configured to control or direct one or more processes in system 200. The controller 250 can be electrically coupled via, e.g., a wire, to one or more elements of the system 200. A wire 251a electrically couples controller 250 with the EM radiation unit 210. Wire 251b electrically couples controller 250 with the optical detection unit 230. For example, a processor of the controller 250 can be utilized to determine and/or analyze a characteristic of a lithium-containing structure based on the emission. In some embodiments, once the optical detection unit 230 separates the emitted light into discrete wavelengths, a processor can be utilized to measure and/or store data of the intensity levels for each wavelength emitted. The data describes the chemical character and composition of the sample analyzed since each element, e.g., lithium, copper, nickel, etc., has a unique set of spectral line patterns.

The controller 250 includes at least one processor 252, a memory 254, and support circuits 256. The at least one processor 252 may be one of any form of general purpose microprocessor, or a general purpose central processing unit (CPU), each of which can be used in an industrial setting, such as a programmable logic controller (PLC), supervisory control and data acquisition (SCADA) systems, or other suitable industrial controller. The memory 254 is non-transitory and may be one or more of readily available memory such as random access memory (RAM), read only memory (ROM), or any other form of digital storage, local or remote. The memory 254 contains instructions, that when executed by the at least one processor 252, facilitates one or more operations of processes described herein (e.g., one or more operations shown in FIGS. 6A-6C). For example, the at least one processor 252 can be configured to determine one or more characteristics of the one or more lithium-containing structures 102.

The instructions in the memory 254 are in the form of a program product such as a program that implements the method of the present disclosure. The program code of the program product may conform to any one of a number of different programming languages. Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are examples of the present disclosure. In one example, the disclosure may be implemented as the program product stored on a computer-readable storage media (e.g., memory 254) for use with a computer system (not shown). The program(s) of the program product define functions of the disclosure, described herein.

In some embodiments, optical detection unit 230 is an optical spectrometer. The optical spectrometer can have a processor that can measure, determine, and/or analyze the intensity of each wavelength emitted due to ablation. The optical spectrometer separates the light into discrete wavelengths. Each element, e.g., lithium, copper, nickel, etc., has a unique set of spectral line patterns. The intensity levels for each wavelength are measured and the data is stored. The subsequent spectral data describes the chemical character and composition of the sample analyzed.

In operation, and as a non-limiting example, a laser beam from EM radiation unit 210 is directed to the one or more lithium-containing structures 102. The laser beam ablates a portion of the one or more lithium-containing structures 102 causing emission of light. This emitted light 236 is detected by the optical detection unit 230. The intensity of emitted light 236 is proportional to a characteristic that is being determined. For example, the intensity of emitted light 236 measured is proportional to the concentration of the lithium at the ablated site, and the concentration of lithium then corresponds to the characteristic of the one or more lithium-containing structures 102.

As another example, and during Li ablation, the light intensity decreases when Li depletion gets closer to the current collector of the anode. As such, the light intensity can be proportional to the one or more characteristics.

As another example, and when the anode includes various coating profiles—e.g., the edges and the bulk—of alkali metal (e.g., Li), each coating profile can be determined. The tapered edges are located where the alkali metal coating bulk thickness is realized with a ramp from the substrate edge. In both cases, the light intensity can decrease as ablation reaches the substrate, e.g., the current collector.

In some embodiments, the degree of pre-lithiation (or other metal) can be determined through a transfer process. For example, after deposition of lithium or other alkali metal, the deposited lithium or other alkali metal can be subjected to a dry contact (e.g., a Si-graphite substrate), a wet contact (via electrolyte solution), and/or a carrier substrate to determine, e.g., the amount of alkali metal deposited on the electrode, a depth profile of alkali metal deposited on the anode, et cetera. Such transfer processes generally include depositing an alkali metal on the substrate (carrier substrate or Si-graphite), and winding the substrate with an anode in a roll. After a sufficient amount of time (with optionally heating at, e.g., about 100° C.), the roll can be unwound to determine, e.g., the degree of alkali metal transferred from the carrier substrate to the anode and/or the depth profile of alkali metal on the anode.

As described herein, the system 200 can be used in-line with anode manufacturing apparatus, systems, and/or processes, as indicated by arrow 202 and arrow 204. In some embodiments, arrow 202 indicates that the pre-lithiated anode is conveyed from a processing chamber in-line with system 200. This processing chamber can be a chamber used for a pre-lithiation deposition operation or another chamber (e.g., processing chamber 410 of system 400, or one or more chambers of system 500, described below). In some embodiments, arrow 204 indicates that the pre-lithiated anode 100 is conveyed to, e.g., packaging, integration into a device, further processing, reprocessing, et cetera. For example, arrow 204 can refer to a stop/go decision based on the one or more characteristics of the lithium-containing structures. Embodiments of the stop/go decision are described with the methods shown in FIGS. 6A-6C. Briefly, "stop" can indicate that further processing may be utilized on the pre-lithiated anode 100 to, e.g., adjust one or more characteristics of the one or more lithium containing structures 102 of the pre-lithiated anode 100; and "go" can indicate that the pre-lithiated anode 100 passes inspection and the pre-lithiated anode 100 can be removed from the manufacturing line (e.g., system 400 or system 500 described below) and packaged in, e.g., an aluminum pouch, or integrated into a product.

In some examples, the system 200 includes a plurality of EM radiation units and a plurality of optical detection units. Typically, and as shown in FIG. 1, more than one surface of the pre-lithiated anode 100 has lithium-containing structures. Accordingly, a second EM radiation unit can be utilized to direct light to a different lithium-containing structure of the pre-lithiated anode, e.g., EM radiation unit 210 directs light to the first lithium-containing structure 102a, while a second EM radiation unit directs light to the second lithium-containing structure 102b. The optical detection unit 230 is utilized to detect the light emitted from the first lithium-containing structure 102a, while a second detection unit is utilized to detect the light emitted from the second lithium-containing structure 102b. Controllers can be utilized to facilitate operations described herein.

Figure 3:
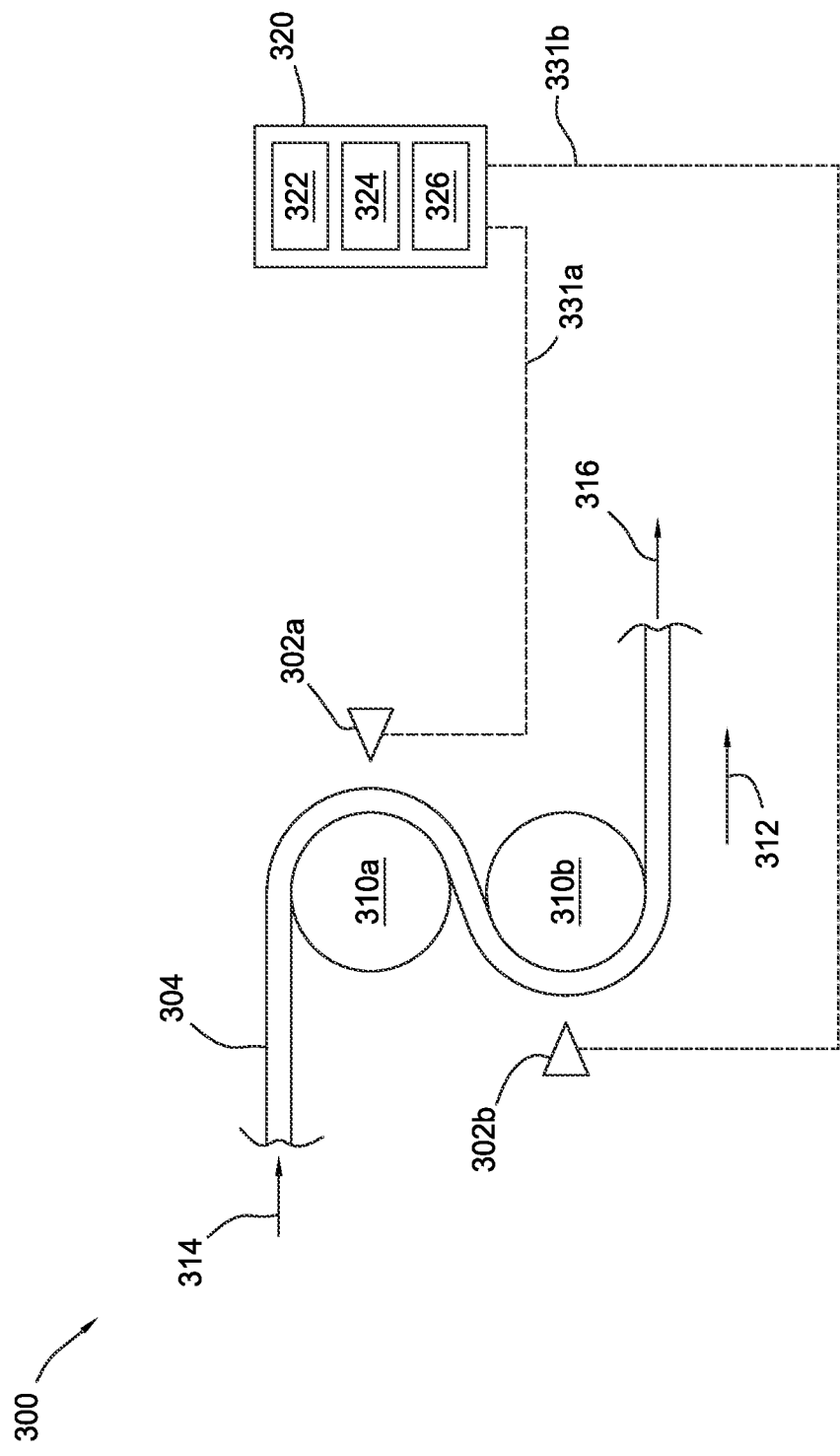
FIG. 3 is a schematic side view of system configured to determine one or more characteristics of a lithium-containing structure of a pre-lithiated anode according to at least one embodiment of the present disclosure.

FIG. 3 is a schematic side view of system 300 configured to determine one or more characteristics of a lithium-containing structure according to at least one embodiment of the present disclosure. System 300 may also be referred to herein as a metrology station. As shown in system 300, the pre-lithiated anode is a flexible layer stack 304. The flexible layer stack can be formed in processing chamber 410 of system 400, or one or more chambers of system 500, described below.

The system includes a pair of radiation-detection units 302a, 302b (collectively 302) each positioned to direct EM radiation to the one or more lithium-containing structures of flexible layer stack 304. The radiation-detection units 302 are also configured to detect emitted radiation from the one or more lithium-containing structures caused by ablating a portion of the flexible layer stack 304. Each of the radiation-detection units 302 include an EM radiation unit (such as EM radiation unit 210) and an optical detection unit (such as optical detection unit 230).

The controller 320, e.g., a computer unit, is generally configured to control or direct one or more processes in system 300. The controller 320 can be electrically coupled via, e.g., a wire, to one or more elements of the system 300. For example, a wire 331a electrically couples controller 320 with the radiation-detection unit 302a. Wire 331b electrically couples controller 320 with the radiation-detection unit 302b. In some examples, different controllers can be used for the different radiation-detection units 302a, 302b.

The controller 320 includes at least one processor 322, a memory 324, and support circuits 326. The controller 320, the at least one processor 322, the memory 324, and the support circuits 326 can be the same as or similar to the controller 250, the at least one processor 252, the memory 254, and the support circuits 256, respectively, as described above with respect to FIG. 2.

The system 300 further includes a plurality of transfer rollers 310a, 310b (collectively 310) for transporting the flexible layer stack 304. The transfer roller 310a is positioned above the transfer roller 310b. The radiation-detection unit 302a is positioned adjacent to the transfer roller 310a to direct radiation to, and detect radiation emitted from, a first side of the flexible layer stack 304 while the flexible layer stack 304 travels over a surface of the transfer roller 310a. The transfer rollers 310 can be configured to transport the flexible layer stack 304 at a linear speed of 0.1 meters per min (m/min) to about 10 m/min, such as from about 0.5 m/min to about 8 m/min, or from about 1 m/min to about 5 m/min during operation. In some embodiments, the linear speed is about 30 m/min to about 50 m/min, such as from about 35 m/min to about 45 m/min. Higher or lower speeds are contemplated. The speed of transfer rollers 310 can be matched with, or approximately matched with, the speed at which the flexible layer stack 304 is formed and/or the speed at which ablation is performed.

The radiation-detection unit 302b can be positioned adjacent to the transfer roller 310b to direct radiation to, and detect radiation emitted from, a second side of the flexible layer stack 304 while the flexible layer stack 304 travels over a surface of the transfer roller 310b. EM radiation sources of the radiation-detection units 302 can be the same as or similar to EM radiation source 212. That is the EM radiation source can be a laser. One or more of radiation-detection units 302 can be positioned to emit a laser beam that is parallel to the travel direction shown by arrow 312 of the flexible layer stack 304. Additionally, or alternatively, one or more of radiation-detection units 302 can be positioned to emit a laser beam that is angled relative to the travel direction shown by arrow 312 of the flexible layer stack 304. The operation and use of the system 300 can be similar to that described above with system 200.

As described herein, the system 300 can be used in-line with anode manufacturing apparatus, systems, and/or processes, as indicated by arrow 314 and arrow 316. For example, system 300 can be utilized with processing chamber 410 of system 400, or one or more chambers of system 500, described below. In some embodiments, arrow 314 indicates that the flexible layer stack 304 is conveyed from a processing chamber in-line with system 300.

In some embodiments, arrow 316 indicates that the flexible layer stack 304 is conveyed to, e.g., packaging, integration into a device, further processing, reprocessing, et cetera. For example, arrow 316 can refer to a stop/go decision based on the one or more characteristics of the lithium-containing structures. Embodiments of the stop/go decision are described with the methods shown in FIGS. 6A-6C. Briefly, "stop" can indicate that further processing may be utilized on the flexible layer stack 304 to, e.g., adjust one or more characteristics of the one or more lithium containing structures 102 of the flexible layer stack 304; and "go" can indicate that the flexible layer stack 304 passes inspection and the flexible layer stack 304 can be removed from the manufacturing line (e.g., system 400 or system 500 described below) and packaged in, e.g., an aluminum pouch, or integrated into a product.

To avoid degradation of lithium due to its interaction with moisture or other sensitive gases, system 200 and system 300 can be operated in a dry room with very low humidity or in a vacuum environment. Laser ablated debris can be removed simultaneously from the processing site by flowing an inert gas, for example, argon, to remove the debris.

Figure 4:
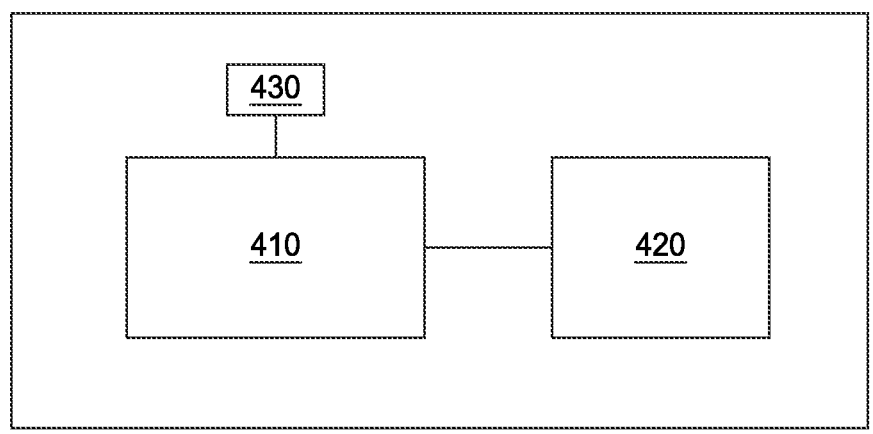
FIG. 4 illustrates a schematic view of system for producing energy storage devices according to at least one embodiment of the present disclosure.

FIG. 4 illustrates a schematic view of system 400 for producing energy storage devices, for example, lithium ion batteries, according to at least one embodiment of the present disclosure. The system 400 includes a processing chamber 410 and a metrology station 420 coupled to the processing chamber 410. The metrology station 420 can be system 200 or system 300. The metrology station 420 is in-line with the processing chamber such that one or more characteristics of the one or more lithium-containing structures 102 can be determined. That is, the metrology station 420 can be utilized for the in-line measurement of lithium structures, coatings, and/or layers of electrodes. Processing chamber 410 can be coupled to arrow 202 and/or arrow 204 of system 200. Processing chamber 410 can be coupled to arrow 314 and/or arrow 316 of system 300. The common processing environment illustrated in system 400 can be operable as a vacuum environment and/or an inert gas environment. In some examples, portions of the common processing environment can be performed without vacuum.

The system 400 further includes a system controller 430 operable to control various aspects of the system 400. The system controller 430 facilitates the control and automation of the system 400 and can include a central processing unit (CPU), memory, and support circuits (or I/O). Software instructions and data can be coded and stored within the memory for instructing the CPU. The system controller 430 can communicate with one or more of the components of the system 400 via, for example, a system bus. A program (or computer instructions) readable by the system controller 430 determines which tasks are performable on a substrate. In some aspects, the program is software readable by the system controller 430, which can include code to control processing of the web substrate. Although shown as a single system controller 430, it should be appreciated that multiple system controllers can be used with the embodiments described herein.

Figure 5:
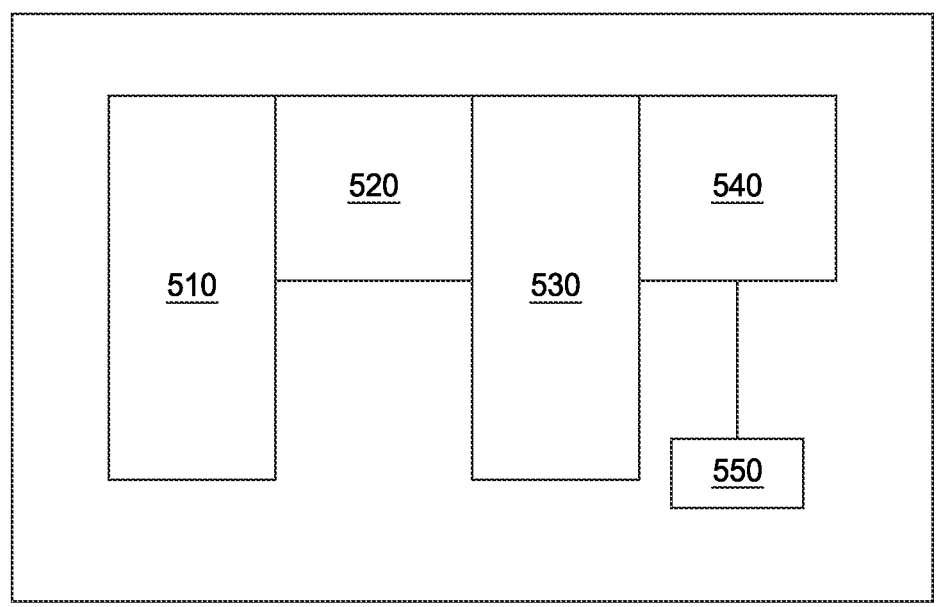
FIG. 5 illustrates a schematic view of system for producing energy storage devices according to at least one embodiment of the present disclosure.

FIG. 5 illustrates a schematic view of system 500 for producing energy storage devices, for example, lithium ion batteries according to at least one embodiment of the present disclosure. The system includes a first processing chamber 510, a laser patterning chamber 520 coupling the first processing chamber to a second processing chamber 530, and the metrology station 540 coupled to the second processing chamber 530. The metrology station 420 can be system 200 or system 300 described above with respect to FIG. 2 and FIG. 3, respectively. The metrology station 540 can be in-line with a processing chamber that produces pre-lithiated anodes (e.g., pre-lithiated anode 100 and/or flexible layer stack 304) such that one or more characteristics of the one or more lithium-containing structures 102 of the pre-lithiated anode 100 and/or flexible layer stack 304 can be determined. That is, the metrology station 540 can be utilized for the in-line measurement of lithium structures, coatings, and/or layers of electrodes.

The common processing environment illustrated in system 500 can be operable as a vacuum environment and/or an inert gas environment. In some examples, portions of the common processing environment can be performed without vacuum. In at least one embodiment, one or more chambers can be performed with different tools (with or without vacuum). For example, pre-lithiation or pre-sodiation can be performed in a vacuum chamber while laser patterning is performed in an environment without a vacuum.

In some embodiments, the metrology station 540 may be positioned at a location between one or more of the first processing chamber 510, the laser patterning chamber 520, or the second processing chamber 530. For example, the metrology station 540 may be positioned between the first processing chamber 510 and the laser patterning chamber 520. As another example, the metrology station 540 may be positioned between the laser patterning chamber 520 and the second processing chamber 530. Selection of the location for the metrology station 540 can be based on, e.g., the stage at which a user desires to measure a property of the lithium coating, e.g., after lithiation, after pre-lithiation, after patterning, et cetera.

The first processing chamber 510 can be configured to deposit a lithium metal film over a web substrate in a roll-to-roll process. In some embodiments which can be combined with other embodiments, the first processing chamber 510 is configured to lithiate or pre-lithiate an anode material formed on the web substrate by depositing a layer of lithium metal on the anode material. In at least one embodiment which can be combined with other embodiments, the first processing chamber 510 is configured to form a lithium metal anode on or over the web substrate. The first processing chamber 510 can include one or more deposition sources. The one or more deposition sources can be configured to deposit a lithium metal film. The one or more deposition sources is not particularly limited. Illustrative, but non-limiting, examples of suitable deposition sources can include thermal evaporation sources, e-beam evaporation sources, PVD sputtering sources, CVD coating sources, slot-die coating sources, kiss roller coating sources, Meyer bar coating sources, gravure roller coating sources, or combinations thereof.

The second processing chamber 530 can be configured to deposit one or more additional films over the patterned lithium metal film(s) in the roll-to-roll process. In one embodiment which can be combined with other embodiments, the additional film(s) is a protective film. The protective film is not particularly limited. Illustrative, but non-limiting, examples of materials that can be used to form the protective film can include lithium fluoride (LiF), aluminum oxide, lithium carbonate ($Li_2CO_3$), lithium-ion conducting materials, or combinations thereof. The second processing chamber 530 can include one or more deposition sources. The one or more deposition sources is not particularly limited. Illustrative, but non-limiting, examples of suitable deposition sources can include PVD sources, such as evaporation or sputtering sources, atomic layer deposition (ALD) sources, CVD sources, slot-die sources, a thin-film transfer sources, or a three-dimensional printing sources.

The laser patterning chamber 520 can be configured to perform a laser ablation process. The laser ablation process is not particularly limited. In some embodiments which can be combined with other embodiments, additional chambers can provide for deposition of an electrolyte soluble binder or the additional chambers can provide for formation of electrode material (positive or negative electrode material). In at least one embodiment which can be combined with other embodiments, additional chambers provide for cutting of the electrode. In some embodiments which can be combined with other embodiments, a wet/dry station is included. The wet/dry station may be suitable for cleaning residues and fragments, or for removing a mask, subsequent to laser patterning of the web.

The system 500 further includes a system controller 550 operable to control various aspects of the system 500. The system controller 550 facilitates the control and automation of the system 500. The system controller can be the same as or similar to the system controller 430 described above.

Figure 6A:
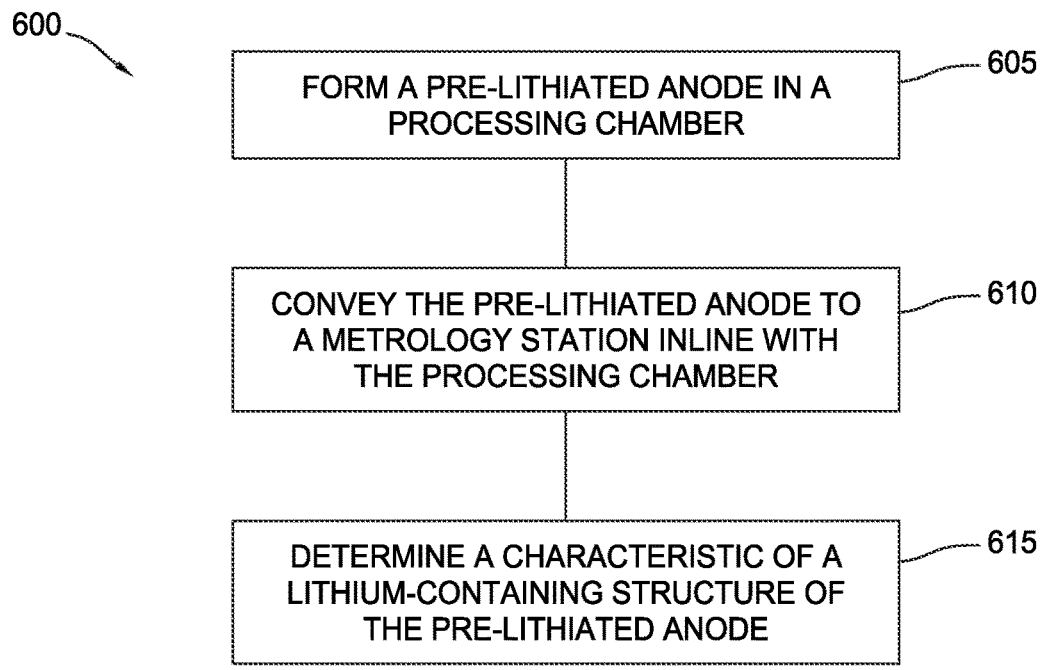
FIG. 6A is a flowchart showing selected operations of a method for processing a pre-lithiated anode according to at least one embodiment of the present disclosure.
Figure 6B:
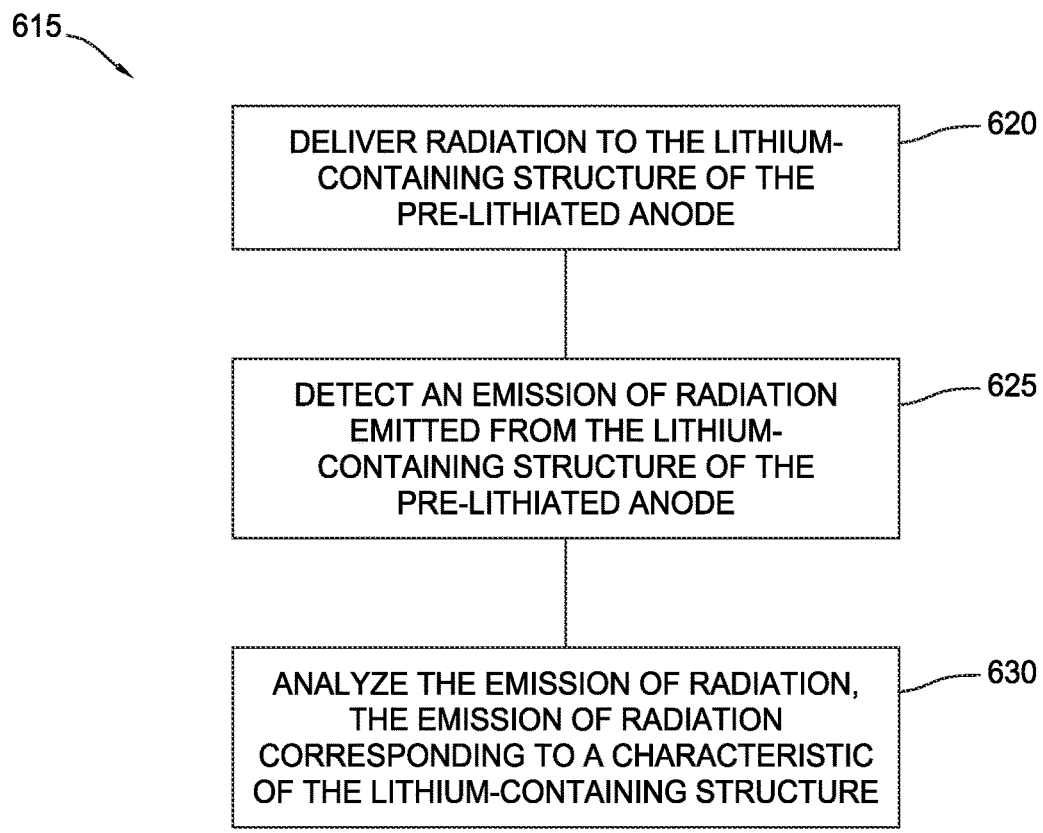
FIG. 6B shows selected suboperations of the method of FIG. 6A according to at least one embodiment of the present disclosure.
Figure 6C:
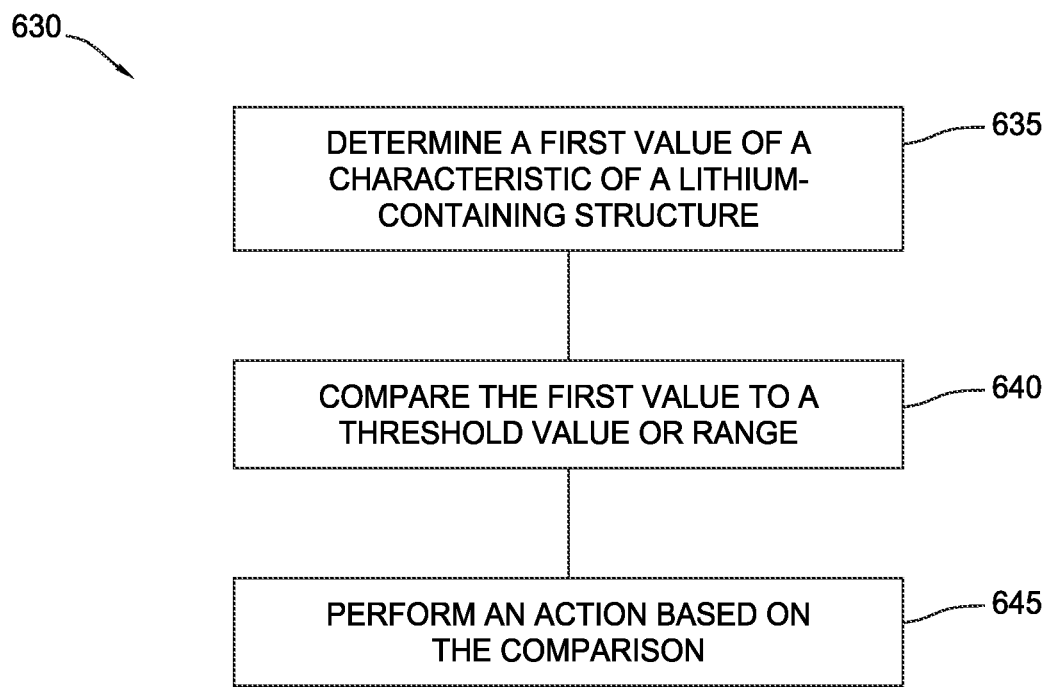
FIG. 6C shows selected suboperations of the method of FIG. 6A according to at least one embodiment of the present disclosure.

FIG. 6A is a flowchart showing selected operations of a method 600 for processing an electrode according to at least one embodiment of the present disclosure. FIGS. 6B and 6C show selected suboperations of the method of FIG. 6A. As described above, the electrode can be an anode or a cathode. The electrode can include an alkali metal-containing structure that includes Li, Na, K, Rb, Cs, one or more ions thereof, or combinations thereof. Although the operations of FIGS. 6A-6C are described with respect to lithium-containing structures of a pre-lithiated anode, other alkali-metal containing structures and cathodes can be subjected to one or more operations shown in FIGS. 6A-6C. In addition, it is contemplated that the flexible layer stack 304 comprising one or more alkali metals (or one or more ions thereof) can be subjected to one or more operations shown in FIGS. 6A-6C.

In some embodiments, the method 600 can be used for determining a characteristic of a lithium-containing structure, coating, or layer of a pre-lithiated anode. The electrode can be an anode or a cathode. The method 600 can be used in-line such that the method 600 is performed within a manufacturing line or process. In some embodiments, one or more operations of method 600 is performed in a metrology station such as system 200 or system 300. For clarity, method 600 is described with system 200, though method 600 can be utilized with system 300. That is reference to system 200 for the operations of FIG. 6A includes reference to system 300.

Method 600 begins with forming a pre-lithiated anode (or flexible layer stack) in a processing chamber, e.g., processing chamber 410 of system 400 or one or more chambers of system 500, at operation 605. The pre-lithiated anode (or flexible layer stack) can include one or more lithium-containing structures 102. Although the remaining operations of the method 600 are discussed in terms of a pre-lithiated anode, it is contemplated that the operations can be utilized with a flexible layer stack.

The pre-lithiated anode is then conveyed to a metrology station (e.g., system 200), at operation 610. The system 200 is in-line and coupled with the processing chamber utilized in operation 605. The system 200 is utilized to determine a characteristic (or a plurality of characteristics) of the one or more lithium-containing structures 102 of the pre-lithiated anode at operation 615.

FIG. 6B shows example suboperations of operation 615. The suboperations shown in FIG. 6B can be performed in a metrology station such as system 200 or system 300. For clarity, the suboperations of operation 615 is described with system 200, though the suboperations of operation 615 can be utilized with system 300.

Operation 615 includes delivering and/or directing electromagnetic radiation or light to the one or more lithium-containing structures of the pre-lithiated anode at operation 620. Here, the EM radiation beam or the light beam 216 is delivered from the EM radiation source 212, such as a laser, to the one or more lithium-containing structures 102 of the pre-lithiated anode 100. The laser beam contacts and ablates a portion of the one or more lithium-containing structures 102 of the pre-lithiated anode 100. The contact or ablation of a portion of the one or more lithium-containing structures 102 causes radiation, or light, to be emitted from the one or more lithium-containing structures. In some embodiments, the speed of Li ablation can be matched with the roll-to-roll manufacturing of anodes.

Operation 615 further includes detecting the emission of radiation emitted from the one or more lithium-containing structures at operation 625. Here, the radiation emitted is detected by optical detection unit 230. Operation 615 can further include analyzing the emission of radiation by a processor, e.g., the at least one processor 252 of the system 200, at operation 630. The emission of radiation corresponds to a characteristic of the one or more lithium-containing structures. Illustrative, but non-limiting, examples of characteristics include a presence, a thickness, a depth profile, a concentration, uniformity of the lithium-containing structure, or combinations thereof.

In some examples, the concentration of Li can be utilized to determine a thickness of the lithium-containing structure at different web locations or at different depth profiles. The concentration of Li can also be utilized to determine a uniformity of the structure (e.g., a coating uniformity) along and/or across a web direction.

The presence, concentration, thickness, depth profiles, uniformity, and/or other characteristics can be determined by analyzing an emission spectral intensity from the ablated area of the lithium-containing structures. In at least one embodiment, a thickness of a lithium-containing structure can be measured by recording the Li intensity fade as a function of time and calibrating against laser power and ablation rates. Here, and in some examples, the presence or absence of the Li is determined using intensity of emission cut-off limits. Based on the ablation rate and time, a user or controller can determine the thickness of the Li-containing structure.

The analysis process of operation 630 can include various suboperations as shown in FIG. 6C. The analysis process can include a stop/go decision where, e.g., a value of a characteristic of the lithium-containing structure is determined, the value is compared to a threshold value, and a stop or go decision is made. "Stop" can indicate that further processing may be utilized on the pre-lithiated anode 100 or flexible layer stack 304 to, e.g., adjust one or more characteristics of the one or more lithium containing structures. "Go" can indicate that the pre-lithiated anode 100 or flexible layer stack 304 passes inspection. Here, the pre-lithiated anode 100 or flexible layer stack 304 can be removed from the manufacturing line and packaged in, e.g., an aluminum pouch, or integrated into a device/product. For clarity, the suboperations of operation 630 are described with system 200, though the suboperations of operation 630 can be utilized with system 300.

In some embodiments, operation 630 can include determining a first value of a characteristic (e.g., thickness, d) of the one or more lithium-containing structures at operation 635. The thickness d is compared to a threshold value of the characteristic (e.g., $d_{th}$) at operation 640. The threshold value $d_{th}$ can be a specific value or a range of values determined based on normal operation data of pre-lithiated and/or lithiated anodes. Normal operation data can be reference data collected for normal (or proper) anode processing. The threshold value $d_{th}$ can be a data set stored on a memory device, such as the memory 254.

The threshold value corresponds to a level of the characteristic, in this example, a thickness of the one or more lithium-containing structures 102 of the pre-lithiated anode 100. Based on the comparison, an action is performed at operation 645.

In some examples, comparison of the measured characteristic to the threshold value of the characteristic at operation 645 can cause a change in the processing path of the pre-lithiated anode. For example, if the measured thickness ($d_m$) of the one or more lithium-containing structures 102 is determined to be less than the threshold value $d_{th}$ (indicating that the one or more lithium-containing structures 102 passes inspection), the pre-lithiated anode 100 can be, e.g., removed from the manufacturing line, packaged, integrated into a device, et cetera, or combinations thereof. If desired, the controller 250 can send a signal to an input/output device, such as a display unit or an audio device (not shown) indicating that the pre-lithiated anode 100 passed inspection and can be removed, packaged, integrated into a device, etc.

If the measured thickness ($d_m$) of the one or more lithium-containing structures 102 is determined to be greater than or equal to the threshold value ($d_m \geq d_{th}$), a different action can be performed on the pre-lithiated anode 100. If desired, the controller 250 can send a warning to an input/output device, such as a display unit or an audio device (not shown). The warning indicates that an action is to be performed on the pre-lithiated anode 100).

An example of the action performed when $d_m \geq d_{th}$ can include processing the pre-lithiated anode 100 again such that the measured characteristic is below the threshold value. For the additional processing, the pre-lithiated anode 100 can be conveyed to a processing chamber in-line with system 200 for another pre-lithiation operation. For example, the pre-lithiated anode can be sent to a pre-lithiation operation and/or laser ablation in the same or separate tool in-line with the system 200. This processing chamber to which the pre-lithiated anode 100 is conveyed may be the same processing chamber where the pre-lithiated anode was formed prior to conveyance to the system 200, or it may be a different processing chamber. That is, the pre-lithiated anode 100 can be conveyed to processing chamber 410 of system 400 or one or more chambers of system 500. As another example of an action to be performed when $d_m \geq d_{th}$, the pre-lithiated anode can be discarded, recycled, used for a different application, graded for quality based on the severity of defects or defect density (defects per unit area), et cetera.

The thickness and/or other characteristic can be determined at a new time iteration. Operations of the method of FIG. 6A-6C can repeat for a predetermined time period or for a predetermined number of determination cycles. In addition, and in some embodiments, at least a portion of the pre-lithiated anode 100 that is measured for the second, third, or nth iteration can include new portions of lithium.

Although methods described herein are shown in separate flowcharts (e.g., FIGS. 6A, 6B, and 6C), one or more operations from each flowchart may be, independently, combined with one or more operations from a different flowchart. For example, operations 620, 625, and/or 630 of FIG. 6B can be combined with operations 605 and 610 of method 600. In addition, although the operations of FIGS. 6A-6C are described with respect to pre-lithiated anode 100, one or more operations of FIGS. 6A-6C can be performed on a flexible layer stack 304.

Embodiments described herein generally relate to systems and methods for determining one or more characteristics of lithium-containing structures of, e.g., pre-lithiated anodes. Embodiments described herein enable, e.g., in-line metrology of the characteristics.

In the foregoing, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the foregoing aspects, features, embodiments, and advantages are merely illustrative and are not considered elements or limitations of the appended claims except where explicitly recited in a claim(s). Likewise, reference to "the disclosure" shall not be construed as a generalization of any subject matter disclosed herein and shall not be considered to be an element or limitation of the appended claims except where explicitly recited in a claim(s).

As used herein, the indefinite article "a" or "an" shall mean "at least one" unless specified to the contrary or the context clearly indicates otherwise.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

While the foregoing is directed to embodiments of the present disclosure, other and further embodiments of the disclosure may be devised without departing from the basic scope thereof, and the scope thereof is determined by the claims that follow.

What is claimed is:

1. A system for processing an electrode comprising an alkali metal containing structure with opposed first and second edges, the system comprising:
   a first processing chamber for forming an electrode comprising an alkali metal containing structure, wherein alkali metal is coated on the alkali metal containing structure; and
   a metrology station coupled to and in-line with the first processing chamber, the metrology station comprising:
      a source of radiation for delivering radiation to and ablating the alkali metal containing structure at a first location between the opposed first and second edges and at a second location between the first location and one of the first and second edges;
      an optical detector for receiving an emission of radiation emitted from the alkali metal containing structure, the optical detector further comprising a diffraction grating configured to separate the radiation emitted into element-specific wavelengths; and
      a processor configured to determine a thickness of the alkali metal containing structure of the electrode based on the emission of radiation, the processor configured to record a change in intensity of one or more selected wavelengths of the radiation emitted from the alkali metal over time at the first location;
      wherein the optical detector detects an emission spectral intensity of laser-ablated alkali metal; and
      the processor analyzes the emission spectral intensity of laser-ablated alkali metal.

2. The system of claim 1, wherein the alkali metal containing structure comprises Li, Na, K, Rb, Cs, an ion thereof, or combinations thereof.

3. The system of claim 1, wherein the electrode is a pre-lithiated anode or a pre-sodiated anode.

4. The system of claim 1, wherein the processor is further configured to:
   determine a first value of the thickness; and
   compare the first value of the thickness to a threshold value or range.

5. The system of claim 4, wherein, when the first value of the thickness is equal to or above the threshold value or range, the processor is further configured to cause the electrode to transfer from the metrology station to a second processing chamber, the second processing chamber being the same as, or different from, the first processing chamber.

6. The system of claim 4, wherein, when the first value of the thickness is equal to or above the threshold value or range, the processor is further configured to:
   determine a second value of the thickness; and
   compare the second value of the thickness to the threshold value or range.

7. The system of claim 4, wherein, when the first value of the thickness is less than the threshold value or range, the processor is further configured to cause the electrode to be packaged or integrated into a device.

8. The system of claim 1, wherein the radiation delivered is infrared radiation, ultraviolet radiation, visible radiation, or combinations thereof.

9. The system of claim 1, wherein the optical detector and the processor are at least a portion of a spectrometer, and
   the processor is configured to record a change in intensity of one or more selected wavelengths of the radiation emitted from the alkali metal over time at the second location and to compare the change of intensity of the one or more selected wavelengths of the radiation emitted from the alkali metal over time at the first location to the change of intensity of the one or more selected wavelengths of the radiation emitted from the alkali metal over time at the second location.

10. A method for processing an electrode comprising an alkali metal containing structure with opposed first and second edges, the method comprising:
   forming an electrode in a first processing chamber, the electrode comprising the alkali metal containing structure, the alkali metal containing structure coated in an alkali metal and comprising Li, Na, K, Rb, Cs, an ion thereof, or combinations thereof;
   conveying the electrode to a metrology station in-line with the first processing chamber; and determining a thickness of the alkali metal containing structure of the electrode, the electrode disposed in the metrology station, wherein determining a thickness comprises:
  delivering radiation to and ablating the alkali metal containing structure to produce an emission of radiation from the ablated alkali metal containing structure at a first location between the opposed first and second edges and at a second location between the first location and one of the first and second edges;
  detecting an intensity of the emission of radiation using an optical detector, the optical detector further comprising a diffraction grating configured to separate the emission of radiation into element-specific wavelengths;
  analyzing the intensity of the emission of radiation, the emission of radiation corresponding to a thickness of the alkali metal containing structure; and
  recording a change in intensity of one or more selected wavelengths of the radiation emitted from the alkali metal over time at the first location.

11. The method of claim 10, wherein analyzing the radiation emitted comprises:
  determining a first value of the thickness;
  comparing the first value of the thickness to a threshold value or range; and
  changing a processing path of the electrode based on the first value.

12. The method of claim 10, wherein:
  the electrode is a pre-lithiated anode or a pre-sodiated electrode.

13. The method of claim 10, further comprising conveying the electrode to a second processing chamber for further processing when a first value of the thickness is equal to or above a threshold value or range, the second processing chamber being the same as, or different from, the first processing chamber.

14. The method of claim 13, further comprising:
  conveying the electrode from the second processing chamber to the metrology station;
  determining a second value of the thickness; and
  comparing the second value of the thickness to a threshold value or range.

15. The method of claim 10, wherein:
  the radiation delivered to the alkali metal containing structure is infrared radiation, ultraviolet radiation, visible radiation, or combinations thereof; and
  the detecting and analyzing is performed by a spectrometer.

16. A non-transitory computer-readable medium storing instructions that, when executed on a processor, perform operations for processing a pre-lithiated anode with opposed first and second edges, the operations comprising:
  forming a pre-lithiated anode in a processing chamber, the pre-lithiated anode comprising a lithium-containing structure on an anode, the lithium-containing structure coated in lithium;
  conveying the pre-lithiated anode to a metrology station in-line with the processing chamber; and
  determining a thickness of the lithium-containing structure of the pre-lithiated anode, the pre-lithiated anode disposed in the metrology station, wherein determining a thickness comprises:
  delivering radiation to and ablating the lithium-containing structure to produce an emission of radiation from the lithium-containing structure at a first location between the opposed first and second edges and at a second location between the first location and one of the first and second edges;
  detecting an intensity of the emission of radiation using an optical detector, the optical detector further comprising a diffraction grating configured to separate the emission of radiation into element-specific wavelengths;
  recording a change in intensity of one or more selected wavelengths of the radiation emitted from the lithium over time at the first location; and
  determining a first value of the thickness, the thickness corresponding to the intensity of the emission of radiation.

17. The non-transitory computer-readable medium of claim 16, wherein the operations further comprise:
  comparing the first value of the thickness to a threshold value or range; and
  changing a processing path of the pre-lithiated anode based on the first value.

18. The non-transitory computer-readable medium of claim 16, wherein:
  the radiation delivered to the lithium-containing structure is infrared radiation, ultraviolet radiation, or visible radiation.

* * * * *